United States Patent [19]
Anada

[11] Patent Number: 5,939,654
[45] Date of Patent: Aug. 17, 1999

[54] HARMONY GENERATING APPARATUS AND METHOD OF USE FOR KARAOKE

[75] Inventor: Keizyu Anada, Hamamatsu, Japan

[73] Assignee: Yamaha Corporation, Hamamatsu, Japan

[21] Appl. No.: 08/937,767

[22] Filed: Sep. 25, 1997

[30] Foreign Application Priority Data

Sep. 26, 1996 [JP] Japan .................................. 8-254294

[51] Int. Cl.$^6$ .............................. G09B 5/00; G10H 1/36
[52] U.S. Cl. .......................... 84/610; 84/634; 434/307 A
[58] Field of Search ............................. 84/609–614, 631, 84/634–638; 434/307 A

[56] References Cited

U.S. PATENT DOCUMENTS

| | | |
|---|---|---|
| 5,231,671 | 7/1993 | Gibson et al. . |
| 5,301,259 | 4/1994 | Gibson et al. . |
| 5,322,966 | 6/1994 | Shimaya ..................................... 84/637 |
| 5,418,325 | 5/1995 | Aoki et al. ................................. 84/613 |
| 5,428,708 | 6/1995 | Gibson et al. . |
| 5,477,003 | 12/1995 | Muraki et al. ............................. 84/610 |
| 5,686,684 | 11/1997 | Nagata et al. ............................ 84/631 |
| 5,712,437 | 1/1998 | Kageyama ................................. 84/610 |
| 5,719,346 | 2/1998 | Yoshida et al. ........................... 84/631 |

*Primary Examiner*—Stanley J. Witkowski
*Attorney, Agent, or Firm*—Pillsbury Madison & Sutro LLP

[57] ABSTRACT

A karaoke apparatus is configured so that, even when a music piece data having no harmony data is to be performed, a harmony voice signal can be generated. Notes of a length not smaller than a quarter note are extracted from a karaoke performance data and a guide melody data of a music piece data. The distributions of frequencies of occurrence of the tones (C to B) are aggregated. The distributions are compared with the major judgment scale and the minor judgment scale. Then, the data is judged to have a key in which the tonic note (scale note) exists at a place where the highest coincidence is attained. A harmony data is generated on the basis of the result of the key judgment and the guide melody data, and a harmony voice signal is produced based on the harmony data.

8 Claims, 9 Drawing Sheets

FIG.1

FIG.2A
CONFIGURATION OF MUSIC PIECE DATA

| HEADER | MUSICAL-TONE TRACK | | |
| --- | --- | --- | --- |
| TITLE GENRE DATA OF ISSUE LENGTH | GUIDE MELODY TRACK | VOICE DATA 1 VOICE DATA 2 | VOICE DATA n |
| | WORD TRACK | | |
| | VOICE TRACK | | |
| | EFFECT TRACK | | |

FIG.2B
CONFIGURATION OF TRACK MUSIC PIECE DATA TRACK

| Δt | EVENT DATA | Δt | EVENT DATA | Δt | EVENT DATA | Δt | EVENT DATA | Δt | EVENT DATA | Δt | EVENT DATA | Δt | EVENT DATA |

FREQUENCY DISTRIBUTION

FIG.4B

MAJOR JUDGMENT SCALE

FIG.4C

MINOR JUDGMENT SCALE

HARMONY GENERATING APPARATUS AND METHOD OF USE FOR KARAOKE

BACKGROUND OF THE INVENTION

1. Field of the Invention

This invention relates to a harmony data generation apparatus which generates a harmony part for the melody of a music piece, and also to a karaoke apparatus which automatically produces a harmony voice signal by using the harmony data.

2. Background

Some of karaoke apparatuses which are currently in practical use have a function of outputting a voice signal obtained by adding a voice signal of a harmony (for example, a melody of three or five degrees with respect to the melody) to a song voice signal of a singer, in order to skillfully sing a karaoke song and enhance the atmosphere of the song.

Only when music piece data includes a harmony data which is used for producing a harmony voice signal, however, such conventional karaoke apparatuses can produce a harmony voice signal on the basis of the harmony data. Therefore, such apparatuses have a drawback that, when a music piece data which does not include harmony data is to be performed, the conventional karaoke apparatuses cannot produce a harmony voice signal and hence they cannot enhance the atmosphere of the song.

SUMMARY OF THE INVENTION

It is an object of the invention to provide a harmony data generation apparatus which, even when music piece data for performing a karaoke music piece fails to include harmony data for a song melody, can generate exact harmony data by using other data, and also a karaoke apparatus which can automatically produce a harmony voice signal in parallel with a karaoke performance by using the harmony data.

The foregoing object of the invention has been achieved by a harmony data generation apparatus which includes:

a storage device stores a music piece data including a melody data and an accompaniment data;

a key detecting device detects a key on the basis of a pitch distribution of the music piece data; and a harmony data generating device generates a harmony data in the key detected by the key detecting device, a pitch of the harmony data being higher or lower than the melody data by a predetermined degree.

Further, the foregoing object of the invention has been achieved by a karaoke apparatus which includes:

a storage device stores a music piece data including a song melody data and a karaoke performance data of a karaoke music piece;

a key detecting device detects a key on the basis of a pitch distribution of the music piece data;

a karaoke performing device reads out the karaoke performance data, thereby executing a performance of the karaoke music piece;

a song inputting device inputs a song voice signal; and a harmony signal producing device converts the song voice signal supplied from the song inputting device into a signal in the key detected by the key detecting device, a pitch of the signal being higher or lower than the song melody data by a predetermined degree, and outputs the converted signal together with the song voice signal supplied from the song inputting device.

All known or conventional usual music pieces such as karaoke music pieces have a distinct tonality. In a music piece having a tonality, the frequencies of occurrence of pitches in the music piece are largely unbalanced depending on the key of the music piece. For example, notes of main pitches such as the tonic note, and notes of three and five degrees frequently occur, and the frequencies of occurrence of semitones deviated from the scale tones are usually low. According to the invention, such a feature of a usual music piece is noted, the frequencies of occurrence of pitches in melody data or an accompaniment data are aggregated, and the key of the music piece is detected on the basis of the distribution of the frequencies of occurrence. The aggregation of the frequencies of occurrence may be conducted by aggregating the frequency of occurrence for each of the twelve tones in which octave information relating to pitches is abstracted. The aggregation may be collectively conducted on the whole of a music piece. Alternatively, a music piece may be divided into plural portions, and the aggregation may be conducted on each of the portions so that a key is detected for each portion. In the alternative, it is possible to detect a modulation in the music piece. When a key is once detected, a harmony data of a suitable interval corresponding to the scale of the key can be generated from the melody data. In the above described karaoke apparatus, each datum of a harmony part is generated from the song melody data such as guide melody data, so as to harmonize a song of a singer. When the detection of a key is conducted at a timing when the music piece data is loaded, a harmony voice signal can be correctly produced in real time in also the case where a modulation occurs.

DETAILED DESCRIPTION OF THE PREFERRED EMBODIMENT

A karaoke apparatus which is an embodiment of the invention will be described with reference to FIGS. 1 to 9B.

The karaoke apparatus is a sound-source karaoke apparatus in which a tone generator is driven by music piece data, thereby generating karaoke performance tones, and which has a harmonizing function. The music piece data is configured by karaoke performance data for driving the tone generator and the like, and other data such as guide melody data (song melody data) indicating a melody which is to be sung by the karaoke singer. Some kinds of music piece data include harmony data (harmony track) for producing a harmony voice signal. A harmony voice signal is a voice signal of a harmony part which proceeds at an interval of three or five degrees with respect to the song melody. Music piece data of about ten thousand music pieces are stored in a hard disk drive 17. The harmonizing function is a function of adding the harmony voice signal to the song voice signal of the singer in accordance with a performance of a karaoke music piece. When music piece data to be performed includes the harmony data, the harmony data is read out and the harmony voice signal is then produced, and, when music piece data does not include a harmony data, then harmony data is generated on the basis of the karaoke performance data and the guide melody data and a harmony voice signal is produced on the basis of the produced harmony data.

Figure 1:
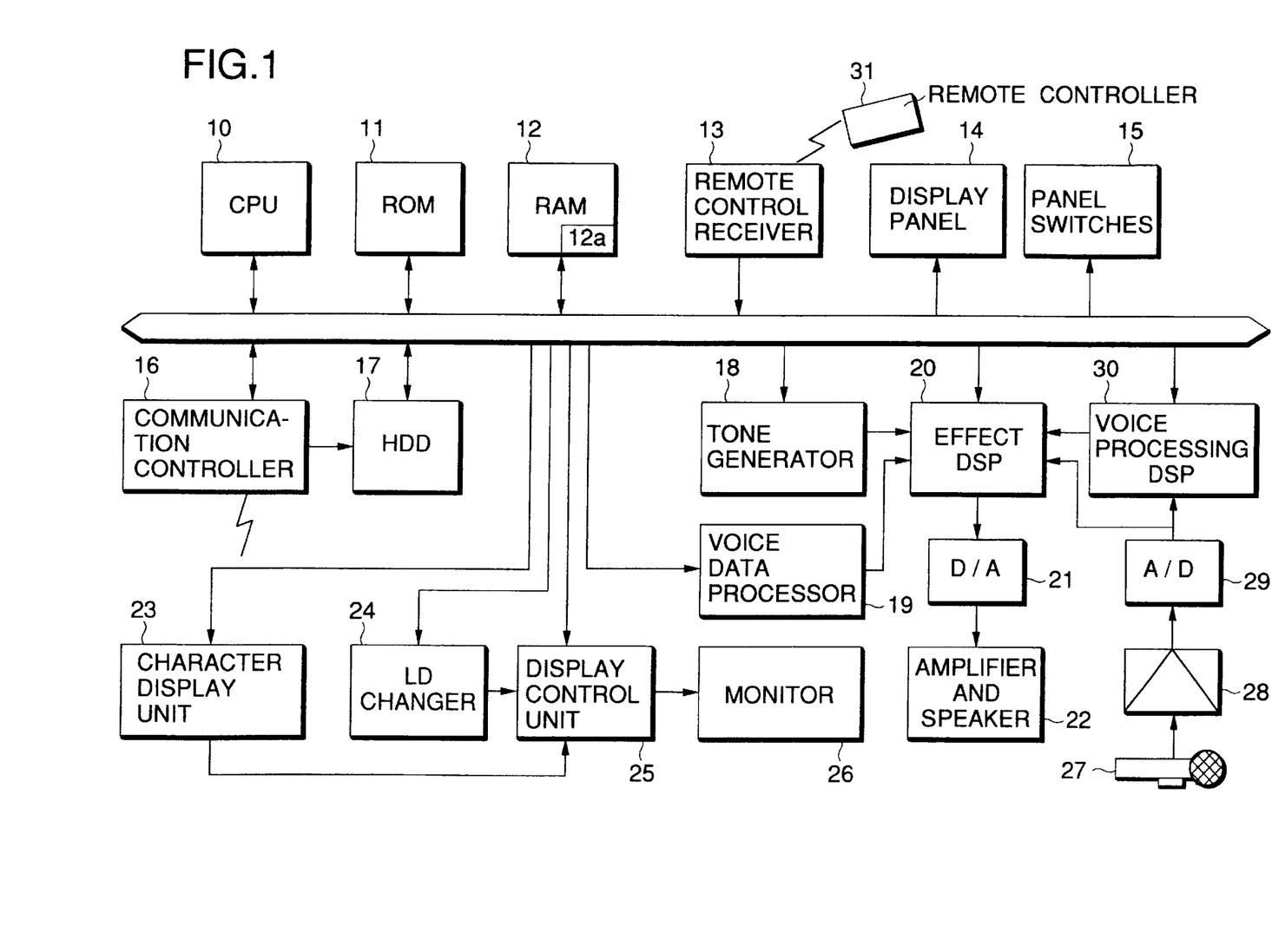
FIG. 1 is a block diagram of a karaoke apparatus which is an embodiment of the invention.

FIG. 1 is a block diagram of the karaoke apparatus. A ROM 11, a RAM 12, the hard disk storage device (HDD) 17, a communication controller 16, a remote control receiver 13, a display panel 14, panel switches 15, a tone generator 18, a voice data processor 19, an effect DSP 20, a character display unit 23, an LD changer 24, a display control unit 25, and a voice processing DSP 30 are connected via a bus to a CPU 10 which controls the operation of the whole apparatus.

The ROM 11 previously stores a system program, application programs, a loader, and font data. The system program is used for controlling the fundamental operation of the apparatus, and the transmission and reception of data to and from peripheral equipment. The application programs include programs for controlling peripheral equipment, a sequence program, and the like. When the karaoke performance is to be done, the sequence program is executed by the CPU 10 so that the generation of tones and the reproduction of images are performed based on a music piece data. The loader is a program for downloading music piece data from a host station. The font data are used for displaying words, a title of a music piece, etc. As the font data, fonts of plural kinds of character types such as Ming type, and Gothic type are stored. In the HDD 17, a music piece data file is formed so as to store music piece data of about ten thousand music pieces. An execution data storing area 12a into which a music piece data of a karaoke music piece selected by the singer is read from the HDD 17 is set in the RAM 12. The communication controller 16 communicates with the host station via an ISDN line and downloads a music piece data and the like from the host station. The downloaded music piece data and the like are written into the HDD 17.

The remote control receiver 13 receives an infrared signal transmitted from a remote controller 31 and reconstructs data. The remote controller 31 is provided with command switches such as a music-piece selecting switch, and numerical keys. When either of these key switches is operated by the user, an infrared ray signal which is modulated by a code in accordance with the operation is transmitted. The display panel 14 is disposed on the front face of the karaoke apparatus, and used for displaying the code of a music piece which is currently played, and the number of reserved music pieces. The panel switches 15 are disposed in a front operating portion of the karaoke apparatus and include a music-piece code input switch and the like.

The tone generator 18 produces a musical-tone signal based on a data supplied from the CPU 10. The tone generator 18 has a plurality of tone generating channels so as to simultaneously produce musical tones of plural parts. The voice data processor 19 produces a voice signal of a designated length and a designated pitch on the basis of a voice data which is an ADPCM data included in the music piece data. The voice data is a data which is obtained by digitizing as it is a signal waveform (such as a back chorus or a sample song tone) which is difficult to be electronically generated by the tone generator 16. On the other hand, a song voice signal input through a vocal microphone 27 is amplified by a preamplifier 28, and then converted into a digital signal in an A/D converter 29. Thereafter, the digital song voice signal is supplied to the effect DSP 20 and the voice processing DSP 30. The digitized song voice signal, and the guide melody data and the harmony data from the CPU 10 are supplied to the voice processing DSP 30. On the basis of these data, the voice processing DSP 30 cuts out waveform element data from the song voice signal of the singer, and combines the waveform element data with each other to produce a harmony voice signal. The harmony voice signal is supplied to the effect DSP 20.

In the case where a harmony data is included in the music piece data, the CPU 10 reads out the harmony data and then supplies the data to the voice processing DSP 30. In the case where a harmony data is not included in the music piece data, when the music piece data is read out from the HDD 17 into the execution data storing area 12a, the CPU 10 aggregates the frequencies of occurrence (the pitch distribution) of the twelve semitones (C to B) in the karaoke performance tone and the guide melody, in parallel with the reading operation, and detects the key of the music piece on the basis of the distribution of the frequencies of occurrence. When the karaoke performance is to be executed, a harmony data is generated on the basis of the guide melody data and the detected key, and the generated harmony data is supplied to the voice processing DSP 30.

The effect DSP 20 receives the musical-tone signal produced by the tone generator 18, the voice signal produced by the voice data processor 19, the song voice signal which is digital-converted by the A/D converter, and the harmony voice signal produced by the voice processing DSP 30. The effect DSP 20 imparts effects such as reverb and echo to the input voice and musical-tone signals. The kinds and degrees of the effects imparted by the effect DSP 20 are controlled based on an event data (DSP control data) of an effect track of the music piece data. On the basis of a sequence program for controlling the DSP, the CPU 10 supplies the DSP control data to the effect DSP 20 at a predetermined timing. The musical-tone and voice signals to which the effects are imparted are converted into analog signals by a D/A converter 21, and then supplied to an amplifier and loudspeaker 22. The amplifier and loudspeaker 22 amplifies the signals and outputs the amplified signals as a sound.

The character display unit 23 generates character patterns of a title of a music piece, words, and the like, based on input character data. On the bases of an input video selection data (chapter number), the LD changer 24 reproduces a corresponding background video of an LD. The video selection data is determined based on a genre data and the like of the karaoke music piece. The genre data is previously written into the header of the music piece data, and, when the karaoke performance is to be started, read out by the CPU 10. The CPU 10 determines which background video is to be reproduced, based on the genre data, and transmits the video selection data designating the background video to the LD changer 24. The LD changer 24 incorporates about five laser disks (120 scenes). so as to reproduce background videos of about 120 scenes. One of the background videos is selected in accordance with the video selection data, and the selected background video is output as a video data. The character pattern and the video data are supplied to the display control unit 25. The display control unit 25 combines these data with each other by the superimpose technique and displays the synthesized image on a monitor 26.

Figure 2A:
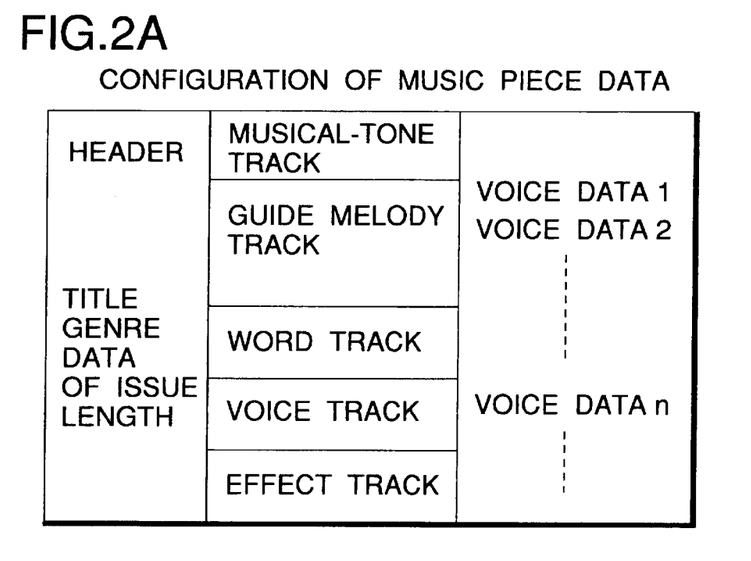
FIG. 2A is a diagram showing the configuration of a music piece data which is used in the karaoke apparatus.
Figure 2B:
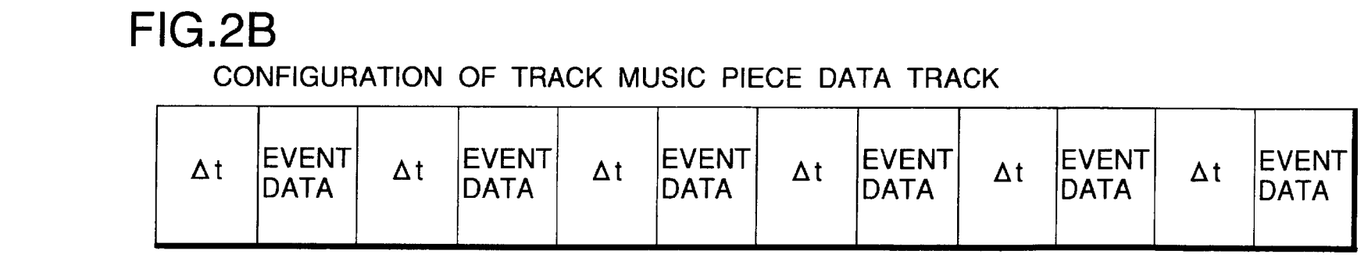
FIG. 2B is a diagram showing an example of the configuration of each track.

Next, the configuration of a music piece data which is used in the karaoke apparatus will be described with reference to FIGS. 2A and 2B. FIG. 2A is a diagram showing the whole configuration of a music piece data. The figure shows an example of a music piece data having no harmony track in which a harmony data is recorded. FIG. 2B is a diagram showing an example of the configuration of each track.

In FIG. 2A, the music piece data includes a header, a musical-tone track, a guide melody track, a word track, a voice track, an effect control track, and a voice data section.

The header is an area into which various data relating to the music piece data are written. Into the header, written are data such as the title of the music piece, the genre, the date of issue, the performance time (length) of the music piece, and a data indicative of existence or nonexistence of a harmony part track. When the karaoke performance is to be started, the CPU 10 reads out the music piece data from the HDD 17 into the execution data storing area 12a. At the same time, the CPU reads the header to judge whether there is a harmony track or not. If the music piece data has a harmony track, only the reading operation is conducted. If the music piece data does not have a harmony track, the frequencies of occurrence (the pitch distribution) of the twelve semitones (C to B) in the musical-tone track and the guide melody track are aggregated in parallel with the reading operation. After the reading operation is ended, the key of the music piece is detected based on the aggregation result. The CPU 10 determines the background video to be displayed, based on the genre data in the header, and transmits the chapter number of the determined video to the LD changer 24. For example, the background video is determined in the following manner. In the case of a Japanese ballad with the theme of winter, a video of a snow country is selected, and, in the case of pops, a video of a foreign country is selected.

As shown in FIG. 2B, each of the tracks is configured by sequence data including plural event data and duration data At respectively indicating time periods between the event data. During a karaoke performance, the CPU 10 reads out the event data of all the tracks in accordance with the sequence program. The sequence program is a program in which a counting operation is conducted in accordance with a predetermined tempo clock signal, and, when the count value reaches At, the next event data subsequent to the duration data At is read out and then supplied to a predetermined processing unit.

The musical-tone track includes tracks of plural parts in order to generate musical tones of plural tone colors. The parts are classified into parts of a normal attribute which produce tones of fixed pitches such as a piano and a flute, and those of a rhythm attribute which produces rhythm tones of unfixed pitches. The length of each musical tone is represented by a total of duration data At ranging from the note-on event data of the tone to the note-off event data. A sequence data of the guide melody which is the song melody of the karaoke music piece is written into the guide melody track. The data is supplied from the CPU 10 to the voice processing DSP 30. On the basis of the data, the voice processing DSP 30 cuts out waveform element data from the song voice signal.

The data of the word track, the voice track, and the effect control track which will be described later are not musical-tone data. In order to uniformalize the implementation and facilitate the working steps, however, also the tracks are written in the form of MIDI data. The kind of these data is a system exclusive message.

The word track is a track in which the sequence data for displaying words on the monitor 26 is stored. In the data description of the word track, usually, words of one line are treated as one word display data. Each word display data includes character data (character codes and display coordinates of the characters) of words of one line, a display time period of the words (usually, about 30 seconds), and a wipe sequence data. The wipe sequence data is a sequence data which is used for changing the display color of the words in accordance with the progress of the performance of the music piece, and in which timings of changing the display color (the time period elapsed after the start of the display of the words) and the changing position (coordinates) are sequentially recorded over the length of one line.

The voice track is a sequence track which designates the occurrence timing of voice data n (n=1, 2, 3, . . . ) stored in the voice data section, etc. Human voices of a back chorus, a harmony song, and the like which are difficult to be synthesized by the tone generator 18 are stored in the voice data section. A voice designating data, and a duration data At which designates the interval of reading the voice designating data, i.e., a timing of supplying a voice data to the voice data processing unit 19 to form a voice signal are written into the voice track. The voice designating data includes a voice data number, a musical interval data, and a volume data. The voice data number is an identification number n of each voice data stored in the voice data section. The musical interval data and the volume data indicate the musical interval and volume of a voice data to be formed. For example, a back chorus containing no word, such as "ah" or "wawawawaa" can be used many times with changing the musical interval and the volume. When such a voice data is stored with a fundamental musical interval and a fundamental volume, therefore, the voice data are used many times with shifting the interval and the volume. The voice data processing unit 19 sets the output level on the basis of the volume data, and sets the musical interval of the voice signal by changing the interval of reading the voice data on the basis of the musical interval data.

A DSP control data for controlling the effect DSP 20 is written into the effect control track. The effect DSP 20 imparts echo-like effects such as reverberation to the signals supplied from the tone generator 18, the voice data processing unit 19, and the voice processing DSP 30. The DSP control data includes a data designating the kind of such an effect, a data indicative of the change amount, etc.

Figure 3:
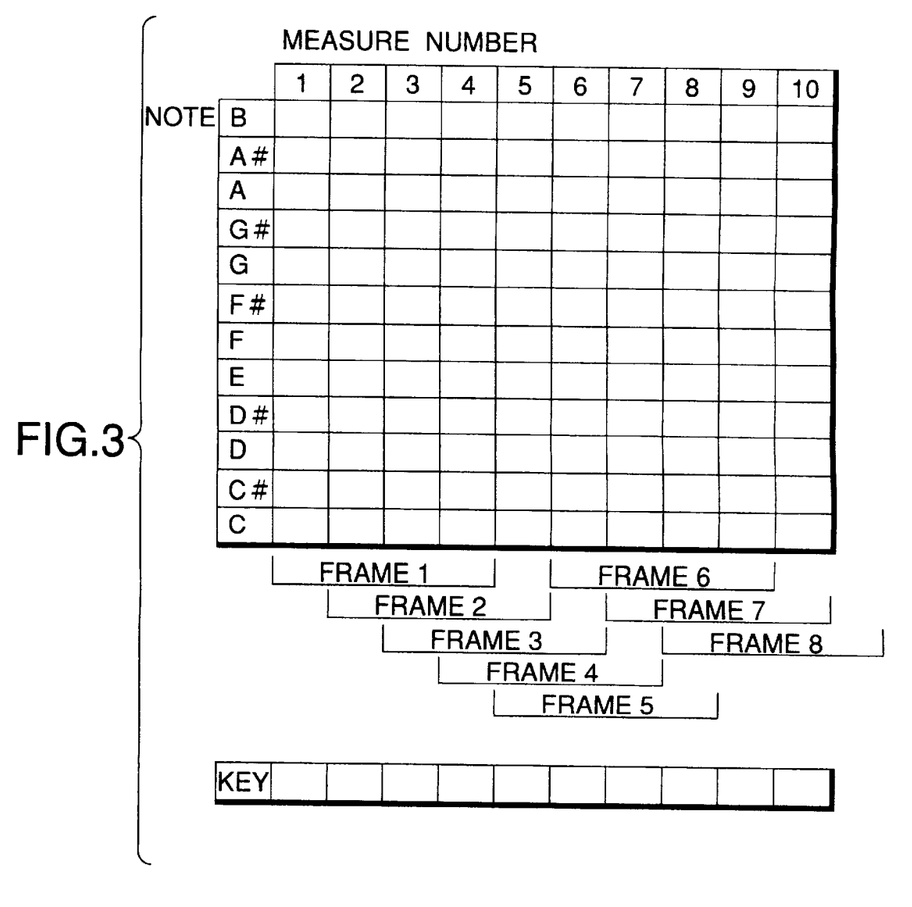
FIG. 3 is a diagram illustrating a method of detecting a key in the karaoke apparatus.
Figure 4A:
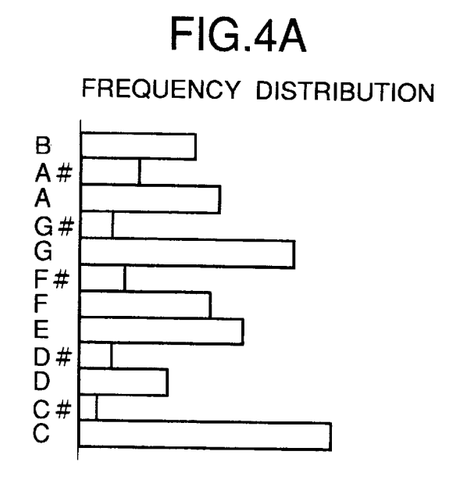
FIGS. 4A to 4C show a diagram illustrating the method of detecting a key in the karaoke apparatus.
Figure 4B:
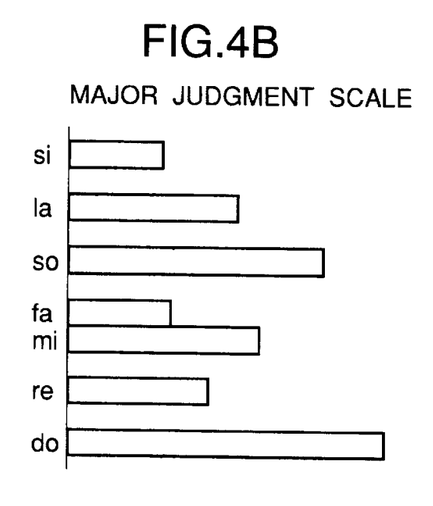
Figure 4C:
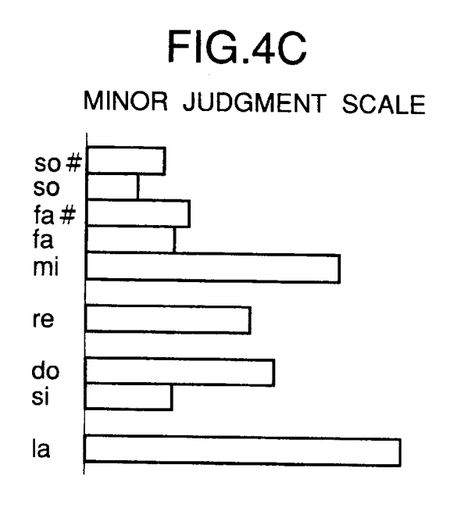

The key detecting operation of the karaoke apparatus will be described with reference to FIGS. 3 to 4C. When a music piece data having no harmony track is read out from the HDD 17 into the execution data storing area 12a of the RAM 12, the CPU 10 conducts the following processes in parallel with the reading operation. Notes of a length not smaller than a quarter note are extracted. The length of each note can be judged from the time interval between the note-on event data and the note-off event data. Notes of a length smaller than a quarter note are not extracted because most of short notes are passing notes irrelevant to the key. The octave information of pitches (note numbers) of the extracted notes is abstracted to be converted into the twelve tones (C to B), and the frequencies of occurrence of the tones are recorded for each measure in an occurrence frequency table of FIG. 3. In this example, the first six measures are in C major, and the seventh and following measures are modulated to A minor. After the operating of reading the music piece data is ended, i.e., after the pitches of all notes not shorter than a quarter note are recorded into the occurrence frequency table, the key is detected from each frame which is configured by four measures. Namely, the first to fourth measures are set to frame 1, the second to fifth measures to frame 2, the third to sixth measures to frame 3, and so forth. First, the frequencies of occurrence of the twelve tones in a frame are aggregated. FIG. 4A shows an example of the distribution of aggregated frequencies of occurrence. The aggregation result is compared with a major judgment scale of FIG. 4B and a minor judgment scale of FIG. 4C, to find a point where the aggregation result coincides with either of the scales at the highest point. Since the frequency distribution of FIG. 4A is the example of A major, the highest coincidence is attained when the distribution is placed at the position of the original C of the major judgment scale. In this case, therefore, it is judged that the distribution shows C major. In the example of FIG. 3, modulation occurs in the seventh measure. In the frames extending over measures including the sixth and seventh measures, therefore, different keys are mixedly aggregated. As a result, in the aggregation results of these frames, the coincidence is low even when the major and minor judgment scales are applied to the results with starting from any tone. From this, it is possible to judge that modulation occurs. Specifically, when frames are obtained in a sequence of a frame in which the coincidence for a certain key is high, that in which the coincidence for all keys is low, and that in which the coincidence for another key is high, it is possible to judge that the modulation point exists in the zone of the frame in which the coincidence for all keys is low.

Figure 5:
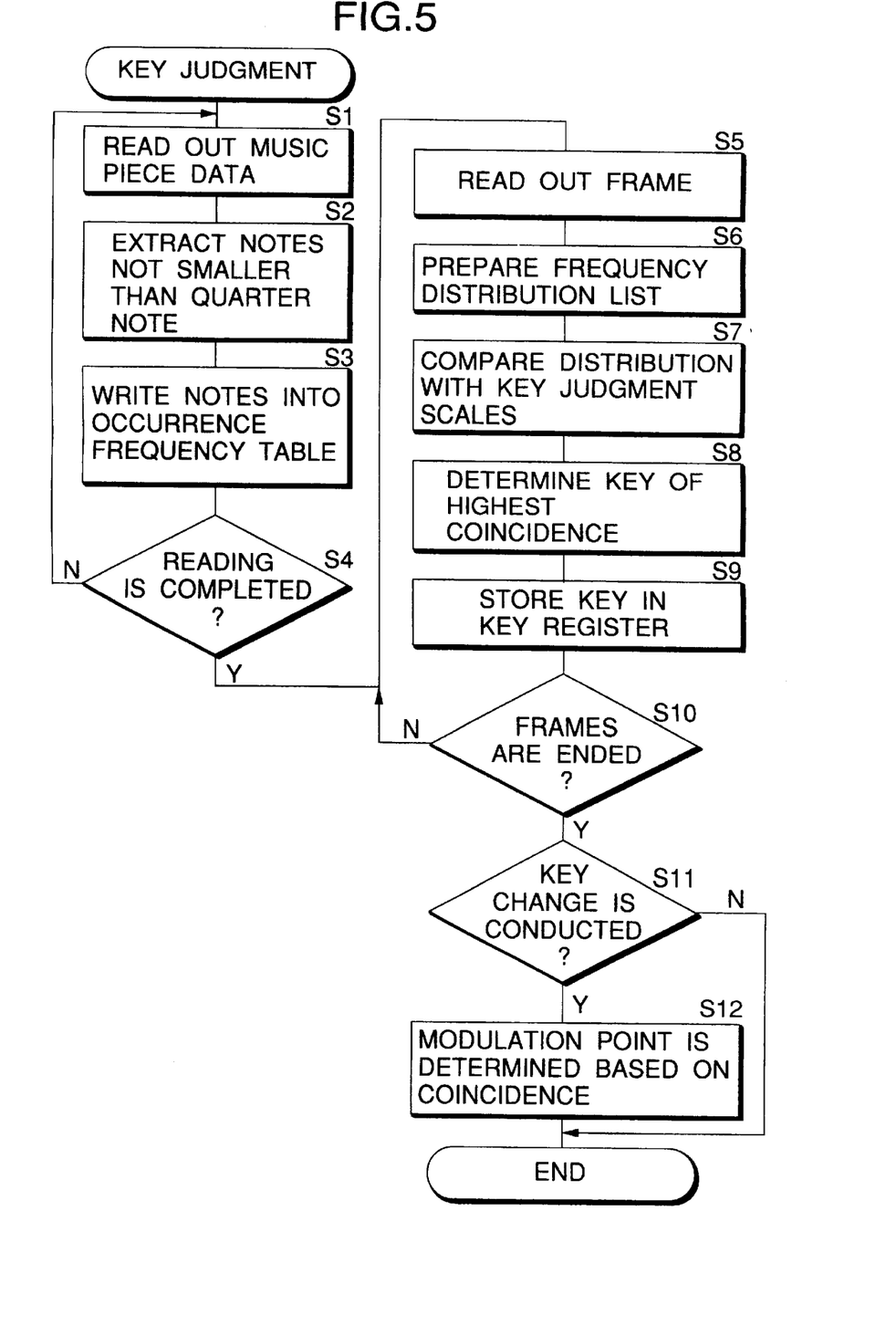
FIG. 5 is a flowchart showing a key detecting operation in the karaoke apparatus.

FIG. 5 is a flowchart showing the key judgment operation. The music piece data of a karaoke music piece selected by the singer is read out from the HDD 17 into the execution data storing area 12a (S1). In parallel with the reading operation, notes of a length not smaller than a quarter note are extracted (s2), and the notes are written into the occurrence frequency table (s3). As shown in FIG. 3, the writing operation is conducted for each measure. The above-described operations are repeated until the operation of reading out the music piece data is completed (s4).

When the operation of reading out the music piece data is completed, the following processing is conducted on the frames in the sequence starting from frame 1. First, the frequency data of the frame is read out (s5), and a frequency distribution list (see FIG. 4A) is prepared (s6). The frequency distribution list is compared with the major and minor judgment scales of FIGS. 4B and 4C (s7). Specifically, the tonic note (do) of the major judgment scale is made coincident with the position of C and then the scale is compared in shape with the distribution list. Next, the tonic note (do) of the major judgment scale is made coincident with the position of C# and then the scale is compared in shape with the distribution list. Next, such comparison is conducted while the tonic note is made coincident with the position of each of the remaining ones of the twelve semitones, or D, . . . , B. With respect to the minor judgment scale also, the tonic note (la) is made coincident with each of the twelve semitones and then the scale is compared in shape with the distribution list. As a result of the comparisons, the key of the highest coincidence is determined as the key of the frame (s8). The determined key and the point of the coincidence are stored in a key register which is formed for each measure in correspondence with the occurrence frequency table (s9). The above-described operations are repeated until the operations are conducted on all the frames (the whole of the music piece) (s10). After this process is completed, it is judged whether a key change is conducted at a midpoint of the music piece or not (s11). If a key change is conducted, the modulation point is exactly determined based on the change in the point of the coincidence (s12). According to this configuration, incorrectness due to a key judgment which uses frames extending over different measures can be eliminated.

Figure 6:
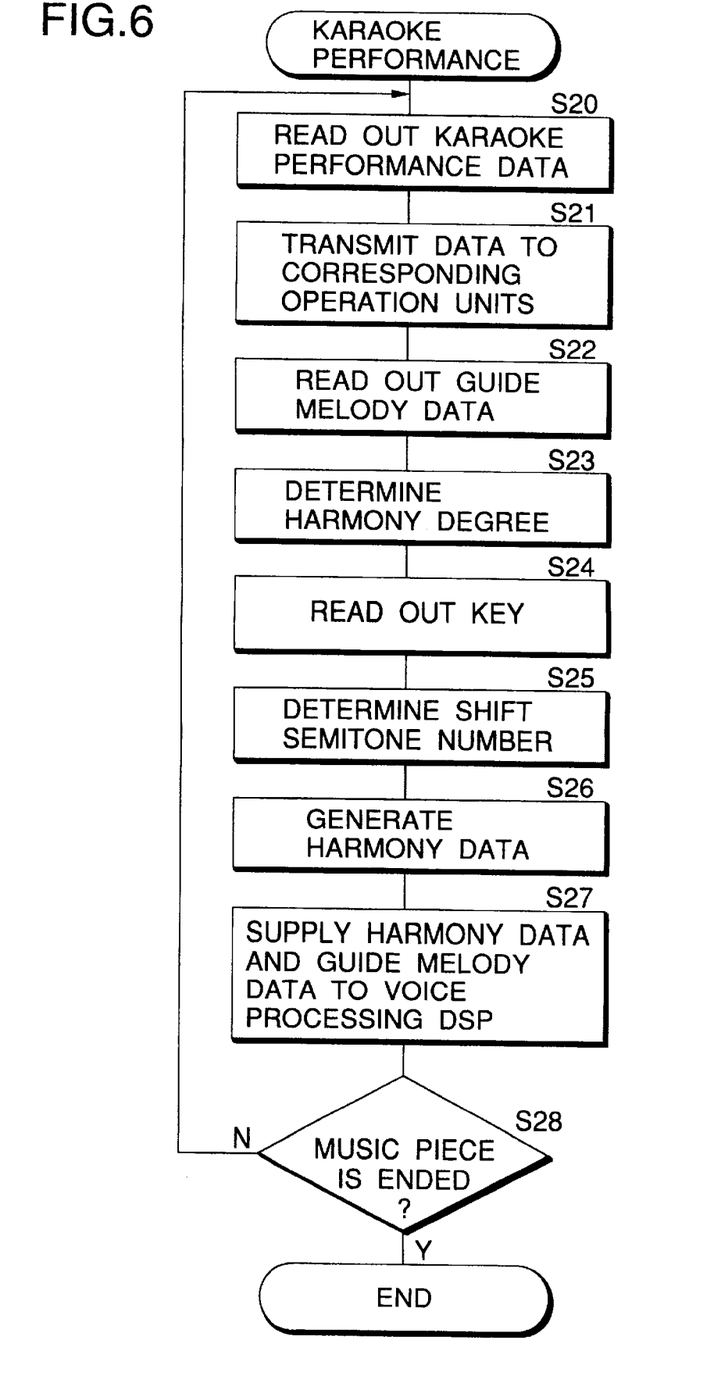
FIG. 6 is a flowchart showing an operation of reading a musical piece data in the karaoke apparatus.

FIG. 6 is a flowchart showing an operation of producing a harmony data. The operation is conducted in parallel with a karaoke performance. When a karaoke performance is started, karaoke performance data such as the musical-tone data and the effect track are read out (s20), and then transmitted to corresponding operation units such as the tone generator 18 and the effect DSP 20 (s21). Next, the guide melody data is read out from the guide melody track (s22), and the harmony degree with respect to the guide melody (song melody) is determined (s23). Specifically, the harmony is determined to have either of intervals including an interval which is higher than the melody by three degrees, that which is higher than the melody by five degrees, that which is lower than the melody by three degrees, that which is lower than the melody by five degrees, etc. This determination is conducted on the basis of the progress of the melody or the counterpoint. Then, the key of the measure is read out from the key register (s24), and a shift semitone number of the harmony is determined on the basis of the harmony degree determined in s23 and the read out key. The shift semitone number is a value indicating the degree by which the harmony is upward or downward shifted from the guide melody in the term of a note number. The note number data included in the guide melody data is increased or decreased by the shift semitone number, thereby generating a harmony data (s26). The harmony data is supplied together with the guide melody data to the voice processing DSP 30 (s27). The above-described operations are repeatedly executed until the music piece is ended (s28).

Figure 7:
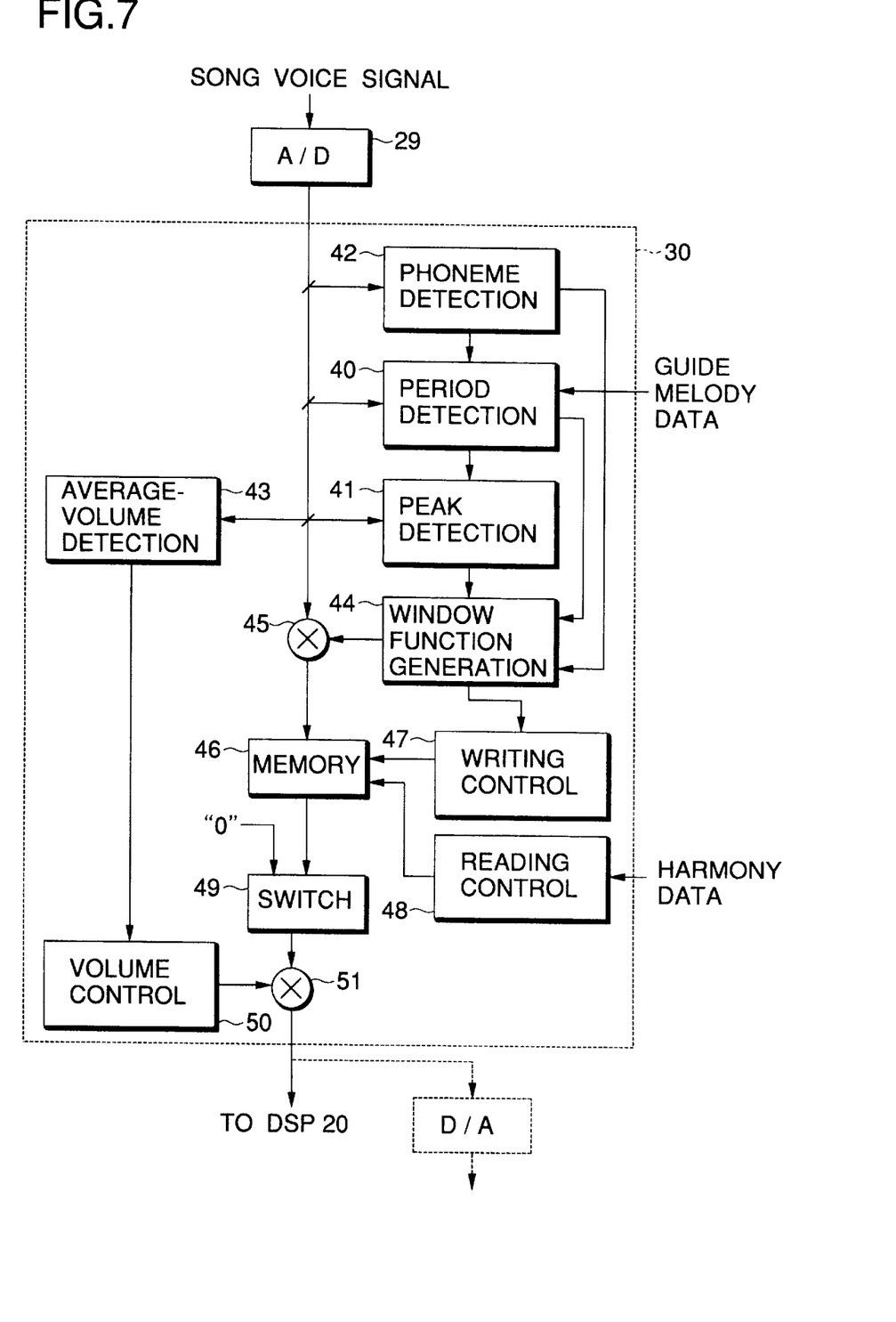
FIG. 7 is a diagram showing a function and configuration of a voice processing DSP of the karaoke apparatus.

FIG. 7 is a diagram illustrating the operation of the voice processing DSP 30. The voice processing DSP 30 produces the harmony voice signal for the input song voice signal. This operation is executed in accordance with a microprogram incorporated in the processor. The microprogram can be expressed in the form of blocks as shown in the figure.

The song voice signal which has been input through the microphone 27, amplified by the preamplifier 28, and converted into a digital signal by the A/D converter 29 is supplied to a period detecting unit 40, a peak detecting unit 41, a phoneme detecting unit 42, an average-volume detecting unit 43, and a multiplier 45 of the voice processing DSP 30.

Figure 8A:
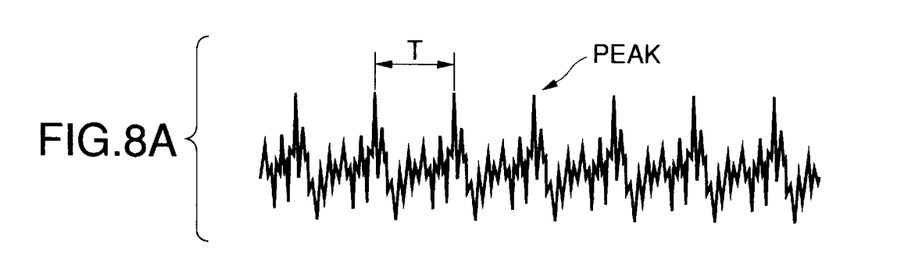
FIGS. 8A to 8C show a diagram illustrating a waveform cutting out operation of the voice processing DSP.

The period detecting unit 40 detects the period T of the input song voice signal from the waveform of the song voice signal (see FIG. 8A). The period detecting unit 40 receives the guide melody data from the CPU 10. The guide melody data is a data indicative of the frequency of the guide melody. When the interval of song voice signals is indefinite in a consonant part or at a turn of tones, the period detecting unit 40 outputs period information which is obtained from the frequency indicated by the guide melody data. The period detecting unit 40 supplies the detected frequency information to the peak detecting unit 41 and a window function generating unit 44.

The peak detecting unit 41 detects a local peak in one period of the input song voice signal (see FIG. 8A). The interval of one period is determined from the period of the period information supplied from the period detecting unit 40. The peak detecting unit 41 supplies the detected peak timing information to the window function generating unit 44.

Figure 8B:
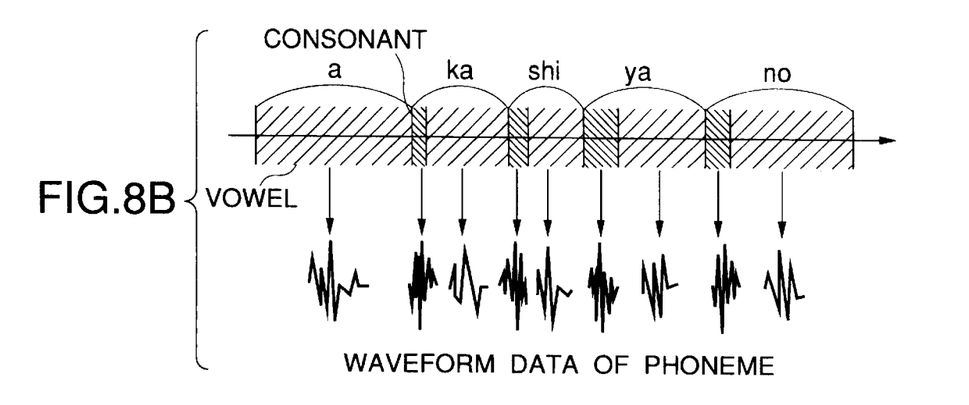

The phoneme detecting unit 42 detects a boundary of a phoneme on the basis of level boundaries of the input song voice signal and variations of frequency components. A phoneme means one of zones obtained by dividing a voice sound into individual consonants and vowels. In FIG. 8B, a word "akashiyano" includes five syllables of "a," "ka," "shi," "ya," and "no." The syllables can be divided into a total of nine phonemes of "a," "k," "a," "sh," "i," "y," "a," "n," and "o." A boundary where the level is lowered exists between the syllables. Although consonants have a white-noise-like aperiodic waveform, vowels have a periodic waveform. The division to phonemes is conducted based on such phenomena. When a boundary of a phoneme is detected, the period detecting unit 40 supplies information indicative of the boundary to the window function generating unit 44.

The average-volume detecting unit 43 smooths the amplitude level of the input song voice signal and detects an average volume. The average-volume detecting unit 43 supplies information indicative of the detected average volume to a volume controlling unit 50.

Figure 8C:
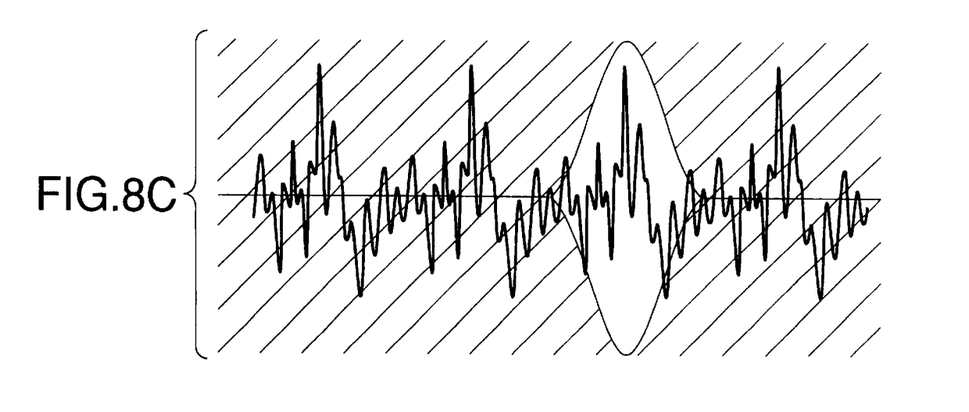

The window function generating unit 44 outputs a window function such as that shown in FIG. 8C. The window function is supplied to the multiplier 45. As described above, the multiplier 45 receives also the song voice signal. Therefore, only the portion of the song voice signal which corresponds to the window function is cut out (see FIG. 8C). As a window function, preferably, a function which is differentially continuous in all the range or from the beginning to the end is used. In the case where a function which is differentially continuous is used, even when only a part (one period) of the song voice signal is cut out, noises are not generated at a boundary of the cut out part. Therefore, the DSP 30 uses $\sin^2(\omega t/2)$ (t=0 to T: T is one period of the song voice signal). As seen also from the expression, the length of the window function is equal to one period of the song voice signal. The length of one period is given by the period information supplied from the period detecting unit 40. The window function generating unit 44 repetitively generates the window function at appropriate intervals of tens milliseconds to 100 milliseconds. The window function is generated with forming a certain time interval in this way because, unless the same waveform element data is continued for a time period of a substantial length, the listener cannot identify the tone color of the waveform element data. By contrast, when information indicative of the boundary of a phoneme is supplied from the phoneme detecting unit 42, the window function is always generated so that waveform element data of a new phoneme is cut out. This is conducted because of the following reason. When a phoneme is switched to another one, the tone color is entirely changed. In order to follow the change, the above-mentioned generation of the window function is conducted. In order to set the peak supplied from the peak detecting unit 41 to be at the center of the window function, the timing of starting the window function is controlled so as to be at an intermediate point between two successive peaks, i.e., at a point of the lowest level. In the waveform element data which is cut out by the above-mentioned window function, the tone color of the song voice signal, i.e., the formant (harmonic components) is substantially preserved as it is.

Concurrently with the generation of the window function, the window function generating unit 44 supplies information indicative of the generation of the window function, and that relating to the length of the window function, to a writing controlling unit 47. In accordance with these sets of information or during the period from the beginning to the end of the window function, the writing controlling unit 47 supplies to a memory 46 a write address which stepwise proceeds in synchronization with a sampling clock signal (44.1 kHz). In response to the input of the write address, the waveform element data which is cut out by the multiplier 45 is stored in the memory 46.

According to this configuration, the waveform element data of one period of the current song voice signal is stored in the memory 46. The waveform element data is repeatedly read out with an arbitrary period. As a result, it is possible to synthesize a voice signal which has the fundamental frequency corresponding to the arbitrary period, and which is provided with the tone color (the configuration of harmonics) of the waveform element data, i.e., the song voice signal. When the waveform element data is repeatedly read out with the period corresponding to the frequency indicated by the harmony data which is in consonant frequency relationship such as three or five degrees with respect to the song voice signal, therefore, it is possible to produce a harmony voice signal which has the frequency and the same tone color as that of the song voice signal.

Figure 9A:
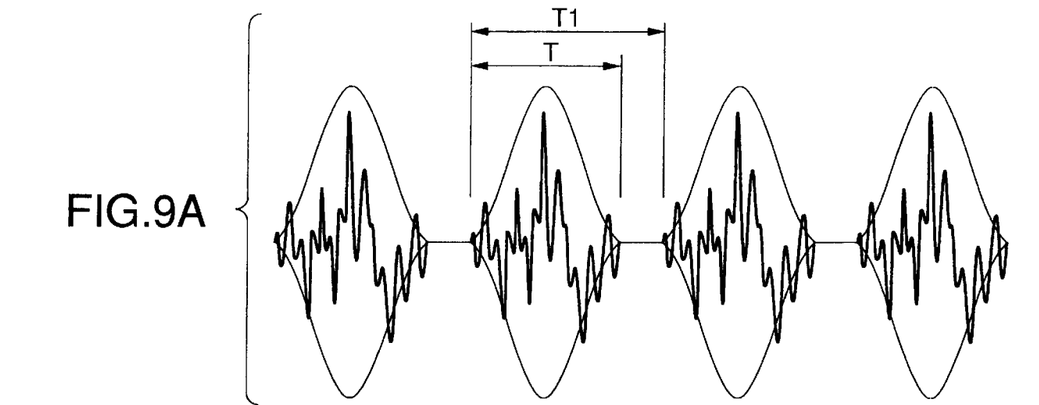
FIGS. 9A and 9B show a diagram illustrating a voice converting operation of the voice processing DSP.
Figure 9B:
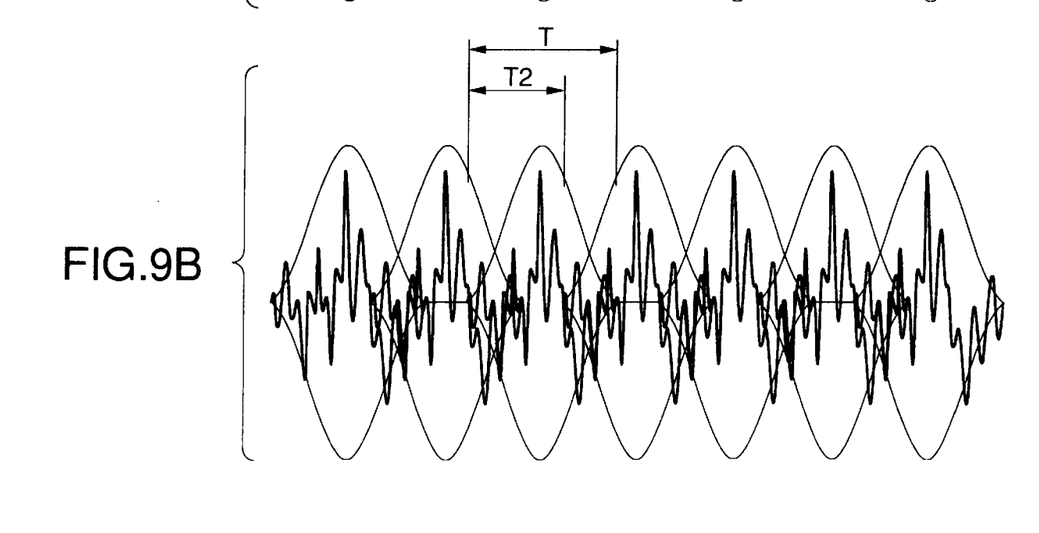

The reading operation on the memory 46 is controlled by a reading controlling unit 48. The reading controlling unit 48 receives the harmony data from the CPU 10. The harmony data is an event data which is read out from the harmony track of the musical-tone data. The reading controlling unit 48 repetitively accesses the memory 46 at the frequency of the harmony data. In other words, the waveform element data is repeatedly read out at a number equal to the frequency of the harmony data, per second. When the harmony is lower in frequency than the guide melody, the harmony voice signal has a waveform in which waveform element data are arranged at intervals of TI which is longer than the data length of T, as shown in FIG. 9A. When the harmony is higher in frequency than the guide melody, the harmony voice signal has a waveform in which waveform element data are overlappingly arranged at intervals of T2 which is shorter than the data length of T as shown in FIG. 9B. As a result, the fundamental frequency of the harmony voice signal is 1/T1 and 1/T2. However, the harmonic components in each waveform element data are preserved as they are. Therefore, the formant similar to the song voice signal is produced. Since the window function is differentially continuous, noises are not generated.

The harmony voice signal which is produced by repeatedly reading out the waveform element data from the memory 64 as described above is supplied to a multiplier 51 via a switch 49. The multiplier 51 receives also a volume control data from the volume controlling unit 50. The volume controlling unit 50 receives the average-volume information of the song voice signal from the average-volume detecting unit 43, and generates a volume control data based on the average-volume information. For example, the volume control data is set to have a value which is 80% of the average-volume information. The harmony voice signal is subjected to a volume control in the multiplier 51, and then supplied to the effect DSP 20. The switch 49 is used when the output is to be forcedly made zero in the case of, for example, a boundary of a phrase.

According to the above-described operation of the voice processing DSP 30, a harmony voice signal in which the tone color of the song voice signal of the singer is preserved as it is can be produced, and, even when the period (frequency) of the song voice signal cannot be detected, the harmony voice signal can be produced without hindrance. In other words, in the case of a song of a usual singer, the frequency of the song voice signal and that of the guide melody data can be deemed not to be largely different from each other. When a waveform element data is cut out at the frequency and then recombined to the song voice signal at a predetermined frequency, therefore, it is possible to produce a harmony voice signal in which the tone color of the singer is substantially maintained.

In the embodiment, a frame, which is used as a unit for the key judgment, includes four measures. The size of a frame is not restricted to this. The key is judged on the basis of the coincidence between the major judgment scale or the minor judgment scale and the distribution of the frequencies of occurrence of the twelve tones. The method of the key judgment based on the distribution of the frequencies of occurrence is not restricted to this.

As described above, according to the invention, even when there is no harmony data, it is possible to generate a harmony data by using a melody data and an accompaniment data. According to the invention, even in the case where a karaoke performance is to be conducted by using an existing music piece data (not having a harmony part), a harmony part can be generated and a harmony voice signal can be produced and output as a sound.

What is claimed is:

1. A harmony data generation apparatus, comprising:

a storage device for storing music piece data including at least guide melody data, karaoke performance data and accompaniment data;

a key detecting device for detecting a key on the basis of a pitch distribution of aggregated frequencies of the occurrence of tones for each selected component of the music piece data; and, a means for generating harmony data in each desired key detected by said key detecting device, whereby a resulting pitch is one of higher and lower than the melody data by a predetermined degree based upon extraction of notes of a length not smaller than a quarter note from said karaoke performance data and said guide melody data, said aggregated distributions of frequencies of occurrence of tones, and a comparison of the derived distributions of frequencies of occurrence of tones with major judgment and minor judgment scales.

2. A karaoke apparatus, comprising:

a storage device which stores music piece data including song melody data and karaoke performance data of a karaoke music piece;

a key detecting device which detects a key on the basis of pitch distribution of the music piece data;

a karaoke performing device which reads out karaoke performance data to execute a performance of the karaoke music piece;

a song inputting device which inputs a song voice signal; and a harmony signal producing device for converting the song voice signal supplied from the song inputting device into a harmony voice signal in the key detected by the key detecting device, a pitch of the signal being one of higher and lower than the song melody data by a predetermined degree, based upon extraction of notes of a length not smaller than a quarter note from said karaoke performance data and said guide melody data, aggregated distributions of frequencies of occurrence of tones from said music piece data, and a comparison of the derived distributions frequencies of occurrence of tones with major judgment and minor judgment scales, and, a means for outputting the converted signal together with the song voice signal supplied from the song inputting device.

3. A method for generating harmony, comprising the steps of:

providing a harmony data generation apparatus, which comprises:

a storage device for storing music piece data including at least guide melody data, karaoke performance data and accompaniment data;

a key detecting device for detecting a key on the basis of a pitch distribution of the music piece data; and, a harmony data generating means for generating harmony data in each desired key detected by said key detecting device;

reading out a music piece comprising music piece data into an execution data storing area;

extracting notes of a length not smaller than a quarter note from the karaoke performance data and the guide melody data of said music piece data;

simultaneously aggregating frequencies of occurrence of twelve semitones in the karaoke performance tone and the guide melody;

detecting a key of said music piece on the basis of distribution of the frequencies of occurrence of respective pitches;

generating harmony data from the guide melody data in combination with the detected key;

supplying generated harmony data to a voice processor; and producing a harmony voice signal based upon said harmony data.

4. A method for generating harmony as defined in claim 3, wherein said step of reading out further includes detecting one of the presence and absence of harmony data.

5. A method for generating harmony as defined in claim 3, wherein said step of detecting further includes detecting a key of said music piece on the basis of the distribution of frequencies of occurrence for each tone in which octave information for pitches can be abstracted.

6. A method for generating harmony as defined in claim 3, wherein said step of simultaneously aggregating is replaced by a step of dividing said music piece into plural portions, and aggregating frequencies of occurrence of twelve semitones in each of the divided portions so that a key is detected for each portion.

7. A method for generating harmony as defined in claim 3, wherein said detecting and generating steps are replaced by detecting a modulation in said music piece and creating harmony data of a suitable interval corresponding to the scale of the key from the melody data.

8. A method for generating harmony as defined in claim 3, wherein said method is performed in a karaoke apparatus.

* * * * *